June 12, 1951          G. R. HINZ          2,556,583
VALVE
Filed Dec. 4, 1944
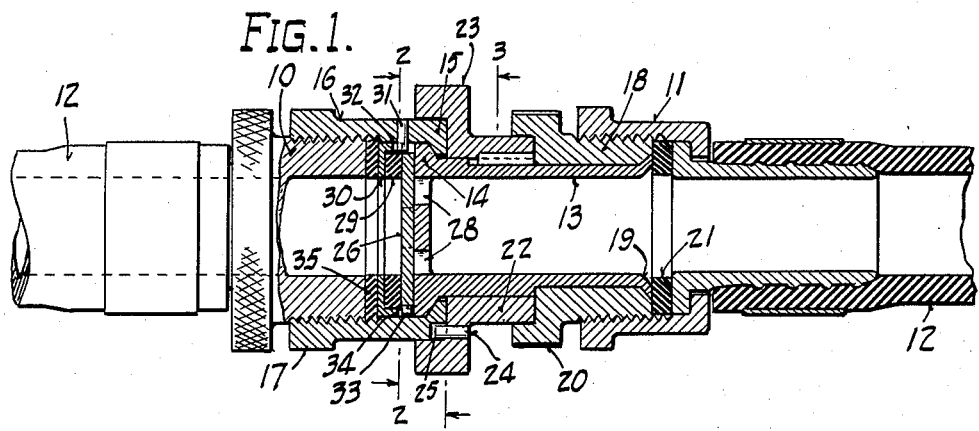
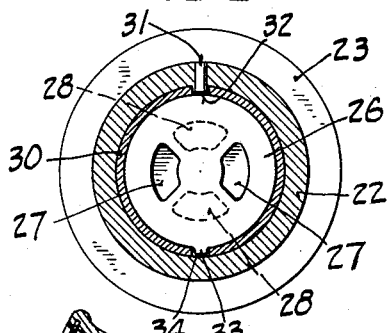
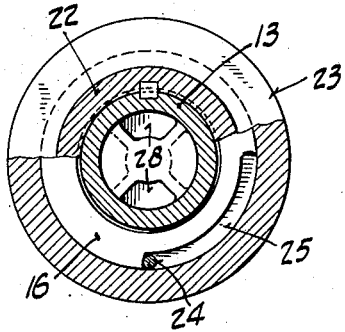
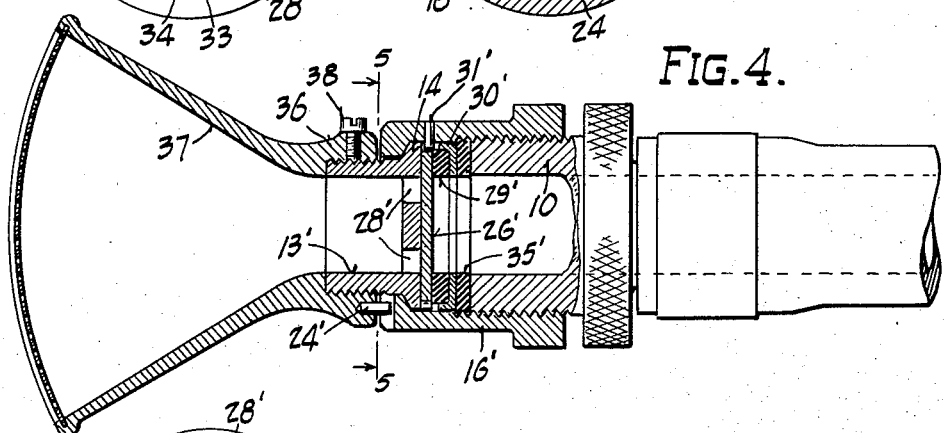
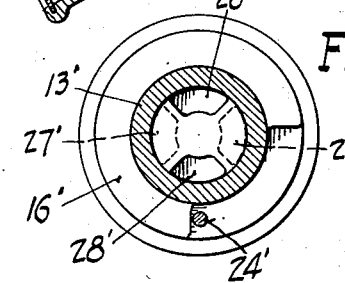
INVENTOR.
Gustav R. Hinz
BY
ATTORNEY.

Patented June 12, 1951

2,556,583

UNITED STATES PATENT OFFICE 2,556,583

VALVE

Gustav R. Hinz, Milwaukee, Wis.

Application December 4, 1944, Serial No. 566,593

2 Claims. (Cl. 251—84)

This invention relates to regulating valves, particularly for garden hose and the like.

One object of the present invention is to provide an effective valve for the purpose indicated of simple economical design.

Another object is to provide a regulating valve capable of being interposed between the conventional elements of a standard hose coupling.

Other more specific objects and advantages will appear, expressed or implied, from the following description of an illustrative embodiment of this invention.

In the accompanying drawings—

Figure 1 is a longitudinal sectional view of a regulating valve constructed in accordance with the present invention and shown incorporated in a conventional garden hose.

Figs. 2 and 3 are transverse sectional views taken substantially along the lines 2—2 and 3—3, respectively, of Fig. 1.

Fig. 4 is a view similar to Fig. 1 of a slightly modified form of regulating valve embodying the present invention and showing the same incorporated in a sprinkler head.

Fig. 5 is a transverse sectional view taken substantially along the line 5—5 of Fig. 4.

The regulating valve shown in Figs. 1, 2, and 3 is adapted to be interposed between the conventional male and female members 10 and 11, respectively, of a standard hose coupling for the purpose of regulating the flow between interconnected lengths of hose 12.

In this instance the valve includes a tubular conductor 13 having an externally flanged end head 14 rotatably seated within and against the internally flanged end 15 of a hollow cup-like member 16. The member 16 is internally threaded to receive the male member 10 of the hose coupling and is preferably equipped with an end collar 17 for operating the same. The conductor 13 extends through a sleeve 18 in which it is rotatably seated, the end of the conductor 13 being peened or otherwise expanded, as at 19, in a manner to retain the sleeve 18 thereon. The sleeve 18 is externally threaded to enter the female member 11 of the hose coupling and is preferably equipped with a suitable operating collar 20. The female coupling member 11 is shown equipped with a conventional washer 21 which coacts with the proximate ends of the sleeve 18 and conductor 13 to prevent leakage at that point.

A ring 22 keyed or otherwise fixed to the conductor 13 and equipped with an operating collar 23 provides a convenient means for rotating the conductor 13 relative to both members 16 and 18.

Any appropriate means, such as a pin 24 carried by the ring 22 and projecting loosely into a groove 25 in the end of the member 16, limits the rotation of ring 22 with respect to the member 16.

Flow of liquid through the conductor 13 is controlled by a disk 26 seated against the face of the end head 14. In this instance the disk 26 is provided with two ports 27 at opposite sides of the center thereof adapted to register with similar ports 28 in the end head 14 when the ring 22 and conduit 13 are rotated into one extreme position, in which position these ports provide open communication between the coupling members 10 and 11. When the ring 22 and conduit 13 are rotated into the other extreme position shown in Figs. 1, 2, and 3, the ports 28 are offset from ports 27 in a manner to prevent flow therethrough.

The disk 26 is preferably yieldably retained against the face of the end head 14 by a washer 29 of rubber or the like confined within a flanged ring 30. A pin 31 projecting inwardly from the member 16 and engaged in a slot 32 in the ring 30 retains the ring 30 against rotation relative to the member 16; and a peripheral lug 33 on the disk 26 engaged in a slot 34 in the ring 30 retains the disk 26 against rotation. The ring 30 is forced toward the end head 14 by the thrust of the male member 10 of the coupling, a sealing washer 35 being preferably interposed between the member 10 and ring 30 to prevent leakage at that point.

The valve shown in Figs. 4 and 5 is similar to that hereinabove described in that it includes a conductor 13' having an externally flanged end head 14' rotatably seated within an internally flanged cup-like member 16' adapted to receive the male member 10 of a conventional hose coupling. Also, the conductor head 14' is provided with ports 28' for cooperation with ports 27' in a disk 26', the disk 26' being retained against the face of the head 14' by a flanged ring 30' interposed between washers 29' and 35' and held against rotation by a pin 31' carried by the member 16', all in the manner above described.

In this instance however the conductor 13' is externally threaded and screwed into the throat 36 of a sprinkler head 37 to which it is secured by suitable means such as a screw 38. The conductor 13' and springler head 37 are thus rotatable as a unit relative to the member 16' and disk 26'. A pin 24' carried by the sprinkler head 37 and projecting into a suitable groove in the end of the member 16' limits relative rotation therebetween.

The arrangement is such that with the parts in the position shown in Figs. 4 and 5 the ports 28' in the conductor head 14' are offset from the ports 27' in the disk 26', so that the valve is closed. By rotating the sprinkler head 37 from the position shown, however, the ports 28' may be positioned to overlap the ports 27' to any desired extent or to register therewith and thereby regulate the flow to and through the sprinkler head.

It will be noted that in both valves hereinabove described the fluid pressure within the coupling member 10 serves to hold the disk 26 or 26' against the face of the conductor head 14 or 14' and thus to aid in maintaining a tight leak-proof fit between that disk and the head 14 or 14'.

Various changes may be made in either embodiment of the invention hereinabove specifically described without departing from or sacrificing the advantages of the invention as defined in the appended claims.

I claim:

1. In a valve of the character described the combination of a hollow member, a liquid conductor having a ported end head rotatably seated in one end of said member, a ported disk in said member, a washer coacting with said disk to press the same against said end head, and a washer retainer interlocked with said disk and said member to hold said disk against rotation relative to said member.

2. In a valve of the character described the combination of a liquid conductor having a ported end head, a hollow member in which said end head is rotatable, said member being threaded to receive one member of a hose coupling, a ported disk fixed against rotation in said hollow member, a second hollow member in which said conductor is rotatable, said second hollow member being threaded to receive another member of a hose coupling, and means disposed radially of said conductor for rotating the same relative to both of said hollow members and said disk to thereby regulate the flow of liquid through said conductor.

GUSTAV R. HINZ.

REFERENCES CITED

The following references are of record in the file of this patent:

UNITED STATES PATENTS

| Number | Name | Date |
| --- | --- | --- |
| 26,994 | Hotz | Jan. 31, 1860 |
| 187,635 | Hunt | Feb. 20, 1877 |
| 341,170 | Reese | May 4, 1886 |
| 627,073 | Cliff | June 13, 1899 |
| 968,462 | Glazier | Aug. 23, 1910 |
| 1,006,450 | Nelson | Oct. 17, 1911 |
| 1,241,765 | Pritchett | Oct. 2, 1917 |
| 1,622,733 | Nelson | Mar. 29, 1927 |
| 1,968,391 | Hamilton | July 31, 1934 |
| 2,055,076 | Grant | Sept. 22, 1936 |
| 2,311,708 | Sundholm | Feb. 23, 1943 |

FOREIGN PATENTS

| Number | Country | Date |
| --- | --- | --- |
| 21,635 | Great Britain | of 1906 |
| 296,164 | Great Britain | of 1928 |